United States Patent
Hintermeister et al.

(10) Patent No.: US 6,345,306 B1
(45) Date of Patent: Feb. 5, 2002

(54) PACKAGER APPARATUS AND METHOD FOR PHYSICALLY AND LOGICALLY PACKAGING AND DISTRIBUTING ITEMS IN A DISTRIBUTED ENVIRONMENT

(75) Inventors: Gregory Richard Hintermeister; Gregory S. Hurlebaus, both of Rochester; Erik Duane Lindberg, Pine Island; Robert Anthony Mahlik; Michael B. Murphy, both of Rochester, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/305,647

(22) Filed: May 5, 1999

(51) Int. Cl.$^7$ ............................................. G06F 15/16
(52) U.S. Cl. ..................... 709/245; 709/246; 709/315; 709/316
(58) Field of Search ................... 709/245, 215, 709/246, 315, 316; 711/153, 173, 206

(56) References Cited

U.S. PATENT DOCUMENTS

| | | | | |
|---|---|---|---|---|
| 4,980,822 A | * | 12/1990 | Brantley, Jr. et al. ....... | 711/202 |
| 5,455,775 A | * | 10/1995 | Huber et al. ................ | 364/488 |
| 5,940,870 A | * | 8/1999 | Chi et al. .................... | 711/206 |
| 6,052,711 A | * | 4/2000 | Gish .......................... | 709/203 |
| 6,163,806 A | * | 12/2000 | Viswanathan et al. ....... | 709/229 |
| 6,182,121 B1 | * | 1/2001 | Wlaschin .................... | 709/215 |
| 6,199,195 B1 | * | 3/2001 | Goodwin et al. ............. | 717/1 |
| 6,272,555 B1 | * | 8/2001 | Gish .......................... | 709/315 |

* cited by examiner

*Primary Examiner*—Krisna Lim
(74) *Attorney, Agent, or Firm*—Martin & Associates LLC; Derek P. Martin

(57) ABSTRACT

An apparatus and method for creating packages and for transferring packages between computer systems provides a graphical user interface that allows a user to define various attributes for a package. Logical packages may be defined, which specify package elements to include in the package. Physical packages may also be defined, which contain a copy of the package elements specified in the logical package. Once a user defines a logical package, the logical package may be transferred to an endpoint system. The endpoint system reads the logical package, and from the parameters in the logical package determines where to retrieve the package elements and what other actions are appropriate while retrieving the package elements and constructing a physical package. In this manner, the endpoint system retrieves the package elements as required. The preferred embodiment of the present invention defines a packager using an object oriented framework mechanism that defines both core and extensible functions. Core functions of the framework mechanism cannot be modified by a user, while extensible functions in the framework mechanism are extended by a user to define a run-time package application. By providing an object oriented package framework mechanism, a developer can quickly and efficiently generate new package definitions and new features on the graphical user interface used to define a package.

54 Claims, 13 Drawing Sheets

PACKAGER APPARATUS AND METHOD FOR PHYSICALLY AND LOGICALLY PACKAGING AND DISTRIBUTING ITEMS IN A DISTRIBUTED ENVIRONMENT

BACKGROUND OF THE INVENTION

1. Technical Field

The present invention relates in general to the data processing field. More specifically, the present invention relates to the field of data transfer between computer systems.

2. Background Art

Since the dawn of the computer age, computer systems have become indispensable in many fields of human endeavor including engineering design, machine and process control, and information storage and access. In the early days of computers, companies such as banks, industry, and the government would purchase a single computer which satisfied their needs, but by the early 1950's many companies had multiple computers and the need to move data from one computer to another became apparent. At this time computer networks began being developed to allow computers to work together.

Computer networks allow low cost personal computer systems to connect to larger computer systems to perform tasks that such low cost systems could not perform alone. Most companies in the United States today have one or more computer networks. The topology and size of the networks may vary according to the computer systems being networked and the design of the system administrator. It is very common, in fact, for companies to have multiple computer networks. Many large companies have a sophisticated blend of local area networks (LANs) and wide area networks (WANs) that effectively connect most computers in the company to each other.

Numerous different systems have evolved for computers on a network to exchange data. For example, known network protocols establish the manner for computers to exchange data. One example of a known network communication protocol is Transmission Control Protocol/Internet Protocol, known more commonly as TCP/IP. TCP/IP defines a protocol for transmitting small packets of data between two computer systems on a network. While the network communication protocol provides the basic infrastructure for sending and receiving small packets of data, higher-level mechanisms are defined that use the network protocol to accomplish larger tasks. For example, a distributed file management system may transfer a file from one computer system to another on the network. While the network protocol carries out the actual transmission of the data packets, the receiving computer must have a compatible file manager running to recognize the transmission, to assemble the file from the packets, and to store the file on the receiving computer system.

Sometimes it is necessary or desired to package large quantities of data together for transfer between computer systems. Some known methods for packaging large quantities of data use data compression to minimize the size of the file or files being transmitted. For example, personal computers often use a ZIP utility to convert files from an uncompressed format to a compressed format, and an UNZIP utility to convert compressed files to uncompressed files. These compression techniques are typically invoked manually by a user as required to compress files that the user selects. This prevents a user from defining a package today that needs to be assembled and distributed three days from now. In addition, known tools for packaging files together only provide a single output format. Thus, if a package needs to be distributed to an IBM compatible platform and to a UNIX platform, different tools must be used to generate a package in each of those formats. Without a mechanism that supports defining packages of different types easily and efficiently in different output formats, the efficiency of transferring packages of data between distributed systems will be impaired.

DISCLOSURE OF INVENTION

According to the present invention, an apparatus and method for creating packages and for transferring packages between computer systems provides a graphical user interface that allows a user to define various attributes for a package. Logical packages may be defined, which specify package elements to include in the package. Physical packages may also be defined, which contain a copy of the package elements specified in the logical package. Once a user defines a logical package, the logical package may be transferred to an endpoint system. The endpoint system reads the logical package, and from the parameters in the logical package determines where to retrieve the package elements and what other actions are appropriate while retrieving the package elements and constructing a physical package. In this manner, the endpoint system retrieves the package elements as required. The preferred embodiment of the present invention defines a packager using an object oriented framework mechanism that defines both core and extensible functions. Core functions of the framework mechanism cannot be modified by a user, while extensible functions in the framework mechanism are extended by a user to define a run-time package application. By providing an object oriented package framework mechanism, a developer can quickly and efficiently generate new package definitions and new features on the graphical user interface used to define a package.

The foregoing and other features and advantages of the invention will be apparent from the following more particular description of preferred embodiments of the invention, as illustrated in the accompanying drawings.

BEST MODE FOR CARRYING OUT THE INVENTION

Overview—Object-Oriented Technology

Figure 1:
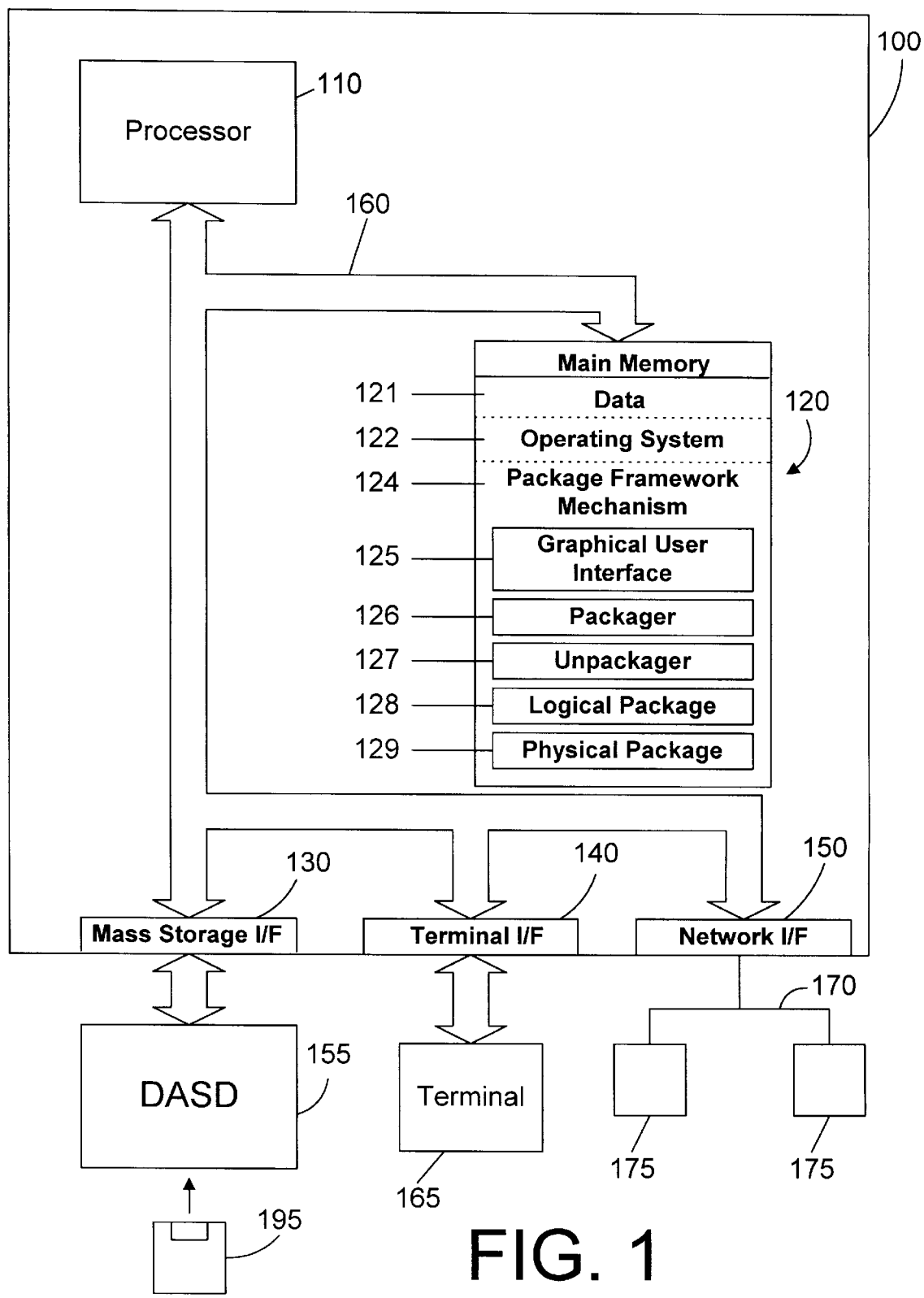
FIG. 1 is a block diagram of a computer system that may be networked with other computer systems to transfer packages in accordance with preferred embodiments of the present invention.

The present invention was developed using object oriented (OO) technology. Individuals skilled in the art of OO technology may wish to proceed to the Detailed Description section of this specification. However, those individuals who are new to OO technology should read this overview section in order to best understand the benefits and advantages of the present invention.

Object Oriented Technology v. Procedural Technology

In general, OO technology is significantly different than conventional, process-based technology (often called procedural technology). While both technologies can be used to solve the same problem, the ultimate solutions to the problem are always quite different. This difference stems from the fact that the design focus of procedural technology is wholly different than that of OO technology. The focus of process-based design is on the overall process that solves the problem; whereas, the focus of OO design is on how the problem can be broken down into a set of autonomous entities that can work together to provide a solution. The autonomous entities of OO technology are called objects. Said another way, OO technology is significantly different from procedural technology because problems are broken down into sets of cooperating objects instead of into hierarchies of nested computer programs or procedures.

The Term Framework

There has been an evolution of terms and phrases that have particular meaning to those skilled in the art of OO design. However, the reader should note that one of the loosest definitions in the OO art is the definition of the word framework. The word framework means different things to different people. Therefore, when comparing the characteristics of two supposed framework mechanisms, the reader should take care to ensure that the comparison is indeed "apples to apples." As will become more clear in the forthcoming paragraphs, the term framework is used in this specification to describe an OO mechanism that has been designed to have core function and extensible function. The core function is that part of the framework mechanism that is not subject to modification by a user of the framework. The extensible function, on the other hand, is that part of the framework mechanism that has been explicitly designed to be customized and extended by a user.

OO Framework Mechanisms

While in general terms an OO framework mechanism can be properly characterized as an OO solution, there is nevertheless a fundamental difference between a framework mechanism and a basic OO solution. The difference is that framework mechanisms are designed in a way that permits and promotes customization and extension of certain aspects of the solution. In other words, framework mechanisms amount to more than just a solution to the problem. The mechanisms provide a living solution that can be customized and extended to address individualized requirements that change over time. Of course, the customization/extension quality of framework mechanisms is extremely valuable to users of the framework because the cost of customizing or extending a framework is much less than the cost of replacing or reworking an existing solution.

Therefore, when framework designers set out to solve a particular problem, they do more than merely design individual objects and how those objects interrelate. They also design the core function of the framework (i.e., that part of the framework that is not to be subject to potential customization and extension by the framework consumer) and the extensible function of the framework (i.e., that part of the framework that is to be subject to potential customization and extension). In the end, the ultimate worth of a framework mechanism rests not only on the quality of the object design, but also on the design choices involving which aspects of the framework represent core function and which aspects represent extensible function.

Notation

There is, as yet, no uniformly accepted notation for communicating object-oriented programming ideas. The notation used in this specification is very similar to that known in the programming industry as Booch notation, after Grady Booch. Mr. Booch is the author of *Object-Oriented Analysis and Design With Applications*, 2nd ed. (1994), available from The Benjamin/Cummings Publishing Company, Inc. Use of Booch notation concepts within this specification should not be taken to imply any connection between the inventors and/or the assignee of this patent application and Mr. Booch or Mr. Booch's employer. The notational system used by Mr. Booch is well-known in the art, and is more fully explained at Chapter 5, pp. 171–228 of the aforementioned book.

It bears mention that the Booch notation includes interaction diagrams that trace the execution of objects and classes. Interaction diagrams are essentially restructured object diagrams. That is, interaction diagrams do not convey any additional information from that conveyed by object diagrams, but simply present the same information in a different format. The present specification makes use of object diagrams rather than interaction diagrams, but those skilled in the art will recognize that they are equivalent and also will understand how to convert from one to the other without further explanation.

DETAILED DESCRIPTION

According to preferred embodiments of the present invention, an apparatus and method allow packaging items together in a package for transfer to another computer system in a distributed environment. A logical package is defined that specifies package elements in the package, but does not contain the package elements themselves. A physical package can then be created from the logical package definition by taking a "snapshot" of the package elements specified in the logical package, and by packaging the snapshot into a physical package.

Referring to FIG. 1, a computer system 100 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device 155 is a floppy disk drive, which may store data to and read data from a floppy disk 195.

Main memory 120 in accordance with the preferred embodiments contains data 121, an operating system 122, and a package framework mechanism 124. Framework mechanism 124 includes a graphical user interface 125, a packager 126, and an unpackager 127. Framework mechanism 124 may be used to define a logical package 128 or a physical package 129. Each of these items is discussed in more detail below.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, and package framework mechanism 124 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system.

Package framework mechanism 124 is an object oriented framework that includes predefined classes that are extended by a user to generate a user-defined packager 126 and a corresponding unpackager 127 that knows how to unpackage these packages. Core functions of the framework mechanism 124 that cannot be changed by a user, when combined with the user-defined extensions, provides a run-time package application that allows sending packages between computers on a network.

Graphical user interface 125 provides output to a user from framework mechanism 124, typically in the form of displays, sounds, and/or other prompts that a user may receive, for example, using a terminal 165 or other I/O device. Graphical user interface 125 also receives user input and allows package framework 124 to act in accordance with that input. In the preferred embodiments, graphical user interface 125 receives user input from a keyboard and mouse or other pointing device. However, any means for graphically providing output to a user and for receiving input from a user is within the scope of graphical user interface 125.

Packager 126 is used to create one or more packages that reference or contain one or more package elements. A logical package 128 is a package definition that identifies package elements, but does not actually contain the package elements. A physical package 129, in contrast, includes a package definition that identifies the package elements, and also includes a copy of the package elements themselves. A logical package 128 thus allows a user to define a package without creating a physical package at that time, while a physical package 129 includes copies of the package elements, and thus comprises a "snapshot" of the logical package at the point in time when the physical package is created. By providing both logical and physical packages, framework mechanism 124 allows a user great flexibility in defining and creating packages.

The term "package element" is used herein in a generic sense to represent literally any type of item that can be packaged together with other items. Examples of suitable package elements include: files, object oriented objects, database entries, software products, user profiles, configuration attributes, data entries in a list, etc. In addition, packages can also be package elements. While the preferred embodiments contemplate homogeneous package elements, it is also within the scope of the present invention to include package elements of different types within the same package.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 2:
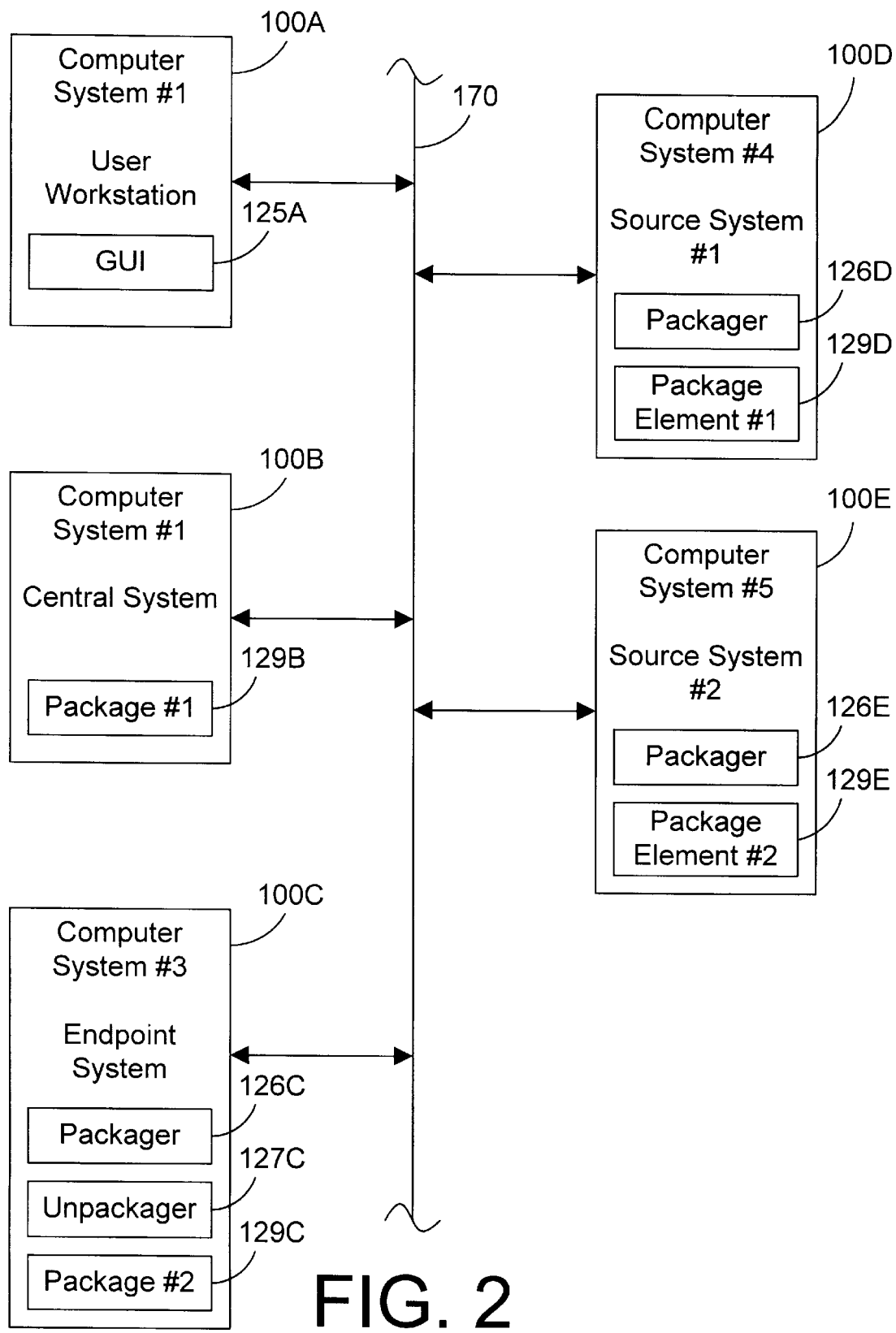
FIG. 2 is a block diagram showing a sample network configuration of five computer systems to illustrate the concepts of packaging and unpackaging in accordance with the preferred embodiments.

Referring to FIG. 2, a sample network of computer systems 100 of FIG. 1 is shown as one possible configuration for illustrating the concepts of the preferred embodiments. A network 170 is used to interconnect computer systems 100A, 100B, 100C, 100D, and 100E. We assume for this example that a user is interacting with GUI 125A on computer system 100A. The user defines one or more packages using GUI 125A. We assume for this example that a package defined by the user is made up of package elements 129D and 129E, which are created using packagers 126D and 126E on source computer systems 100D and 100E, respectively. Once the package is defined, the logical package definition is stored on central computer system 100B (shown as Package 129B in FIG. 2). This logical package definition is then distributed to an endpoint computer system 100C. The endpoint computer system 100C interacts directly with source computer systems 100D and 100E to retrieve the package elements 129D and 129E, and creates a physical package 129C that conforms to the logical package definition stored in central system 100B.

Figure 3:
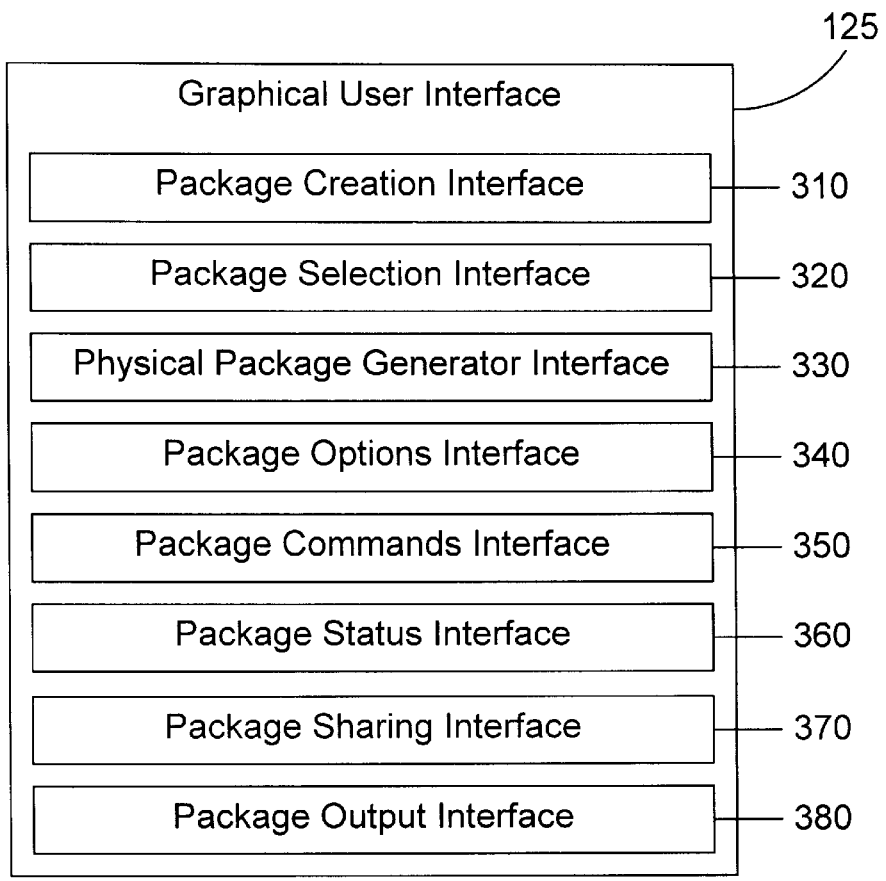
FIG. 3 is a block diagram showing possible interface components for the graphical user interface of FIG. 1.

Graphical user interface 125 of FIGS. 1 and 2 can include many different components. As shown in FIG. 3, GUI 125 may include a package creation interface 310, a package selection interface 320, a physical package generator interface 330, a package options interface 340, a package commands interface 350, a package status interface 360, a package sharing interface 370, and a package output interface 380. Examples of each of these interfaces is shown in FIGS. 10–18, which are discussed in more detail below.

Figure 4:
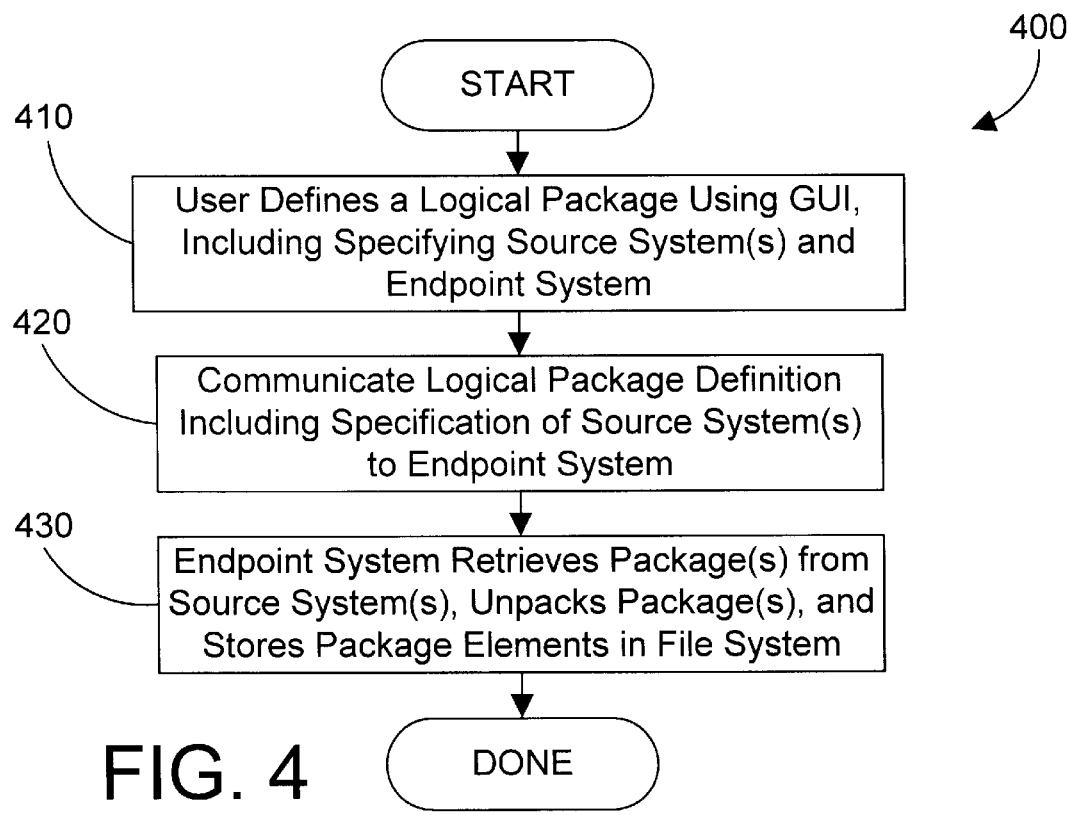
FIG. 4 is a flow diagram showing the steps in a method for packaging, distributing, and unpackaging a package in accordance with the preferred embodiments.
Figure 5:
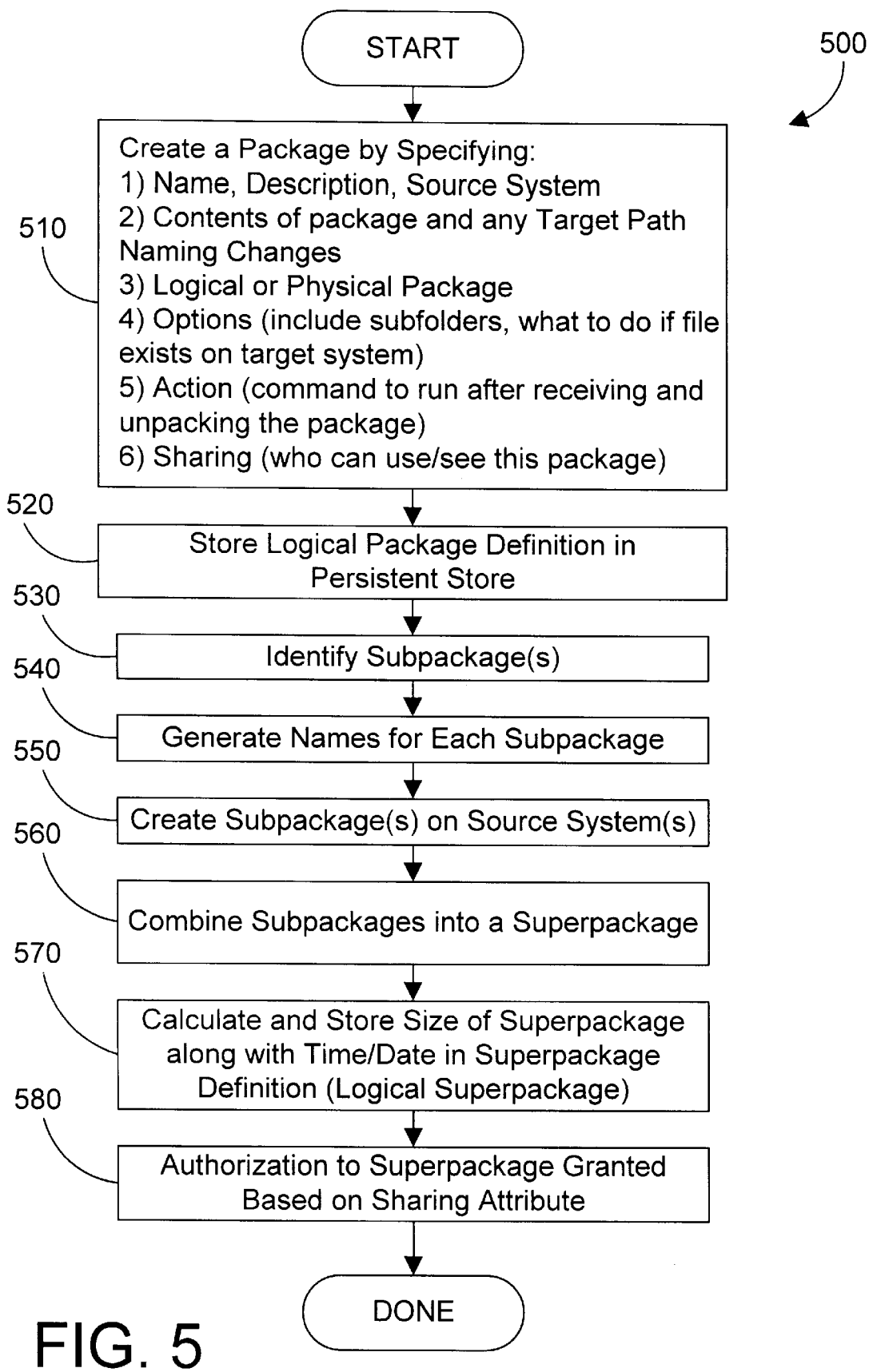
FIG. 5 is a flow diagram showing the steps for defining and assembling a package in accordance with the preferred embodiments.

Referring to FIG. 4, a method 400 for defining and distributing a package in accordance with the preferred embodiments begins when a user defines a logical package using a graphical user interface, including the specification of source and endpoint systems (step 410). Next, the logical package definition is communicated to the endpoint system (step 420). This may be accomplished via a central computer system, as shown in FIG. 2. The endpoint system then retrieves one or more package elements from one or more source systems, unpacks the package elements, and stores the package elements in the file system of the endpoint system (step 430). These steps can better be understood by referring to the sample system configuration of FIG. 2. For this sample system, step 410 is performed by a user using GUI 125A, step 420 is performed by transferring the logical package from computer system 100A to computer system 100C via central system 100B, and step 430 is performed by computer system 100C.

A method 500 for packaging together items into a package in accordance with a preferred embodiment is preferably performed by packager 126 of FIG. 1, and starts by creating a package (step 510). In creating a package, a user preferably specifies 1) the name and description of the package, and the source system where the package resides or will reside; 2) the contents of the package and any target path naming changes; 3) whether the package is a logical or a physical package; 4) options, such as whether or not to include subfolders, or what to do if the file already exists on the target system; 5) any actions that need to be performed after receiving and unpacking a package; and 6) setting sharing parameters to allow other users to view or to view and modify a package. Note that the terms "target" and "endpoint system" are used interchangeably herein.

Once a package is defined in step 510, the logical package definition for the package is stored in a persistent store (step 520). Note that both logical packages and physical packages include a logical package definition. Next, if the package includes other packages, the subpackages are identified (step 530). Package elements may include other packages as well, and a package that contains other packages is referred to herein as a "superpackage", while each contained package is referred to herein as a "subpackage". A name is generated for each subpackage (step 540), and each subpackage is created on its respective source system (step 550). The subpackages are then combined into a superpackage (step 560). The size of the superpackage, along with the time and date of its creation, are then stored as part of the logical superpackage definition (step 570). Finally, authorization to the superpackage is granted based on a sharing attribute of the superpackage (step 580), which specifies whether other users may read and use the package, or whether they may read, use, and modify the package.

Figure 6:
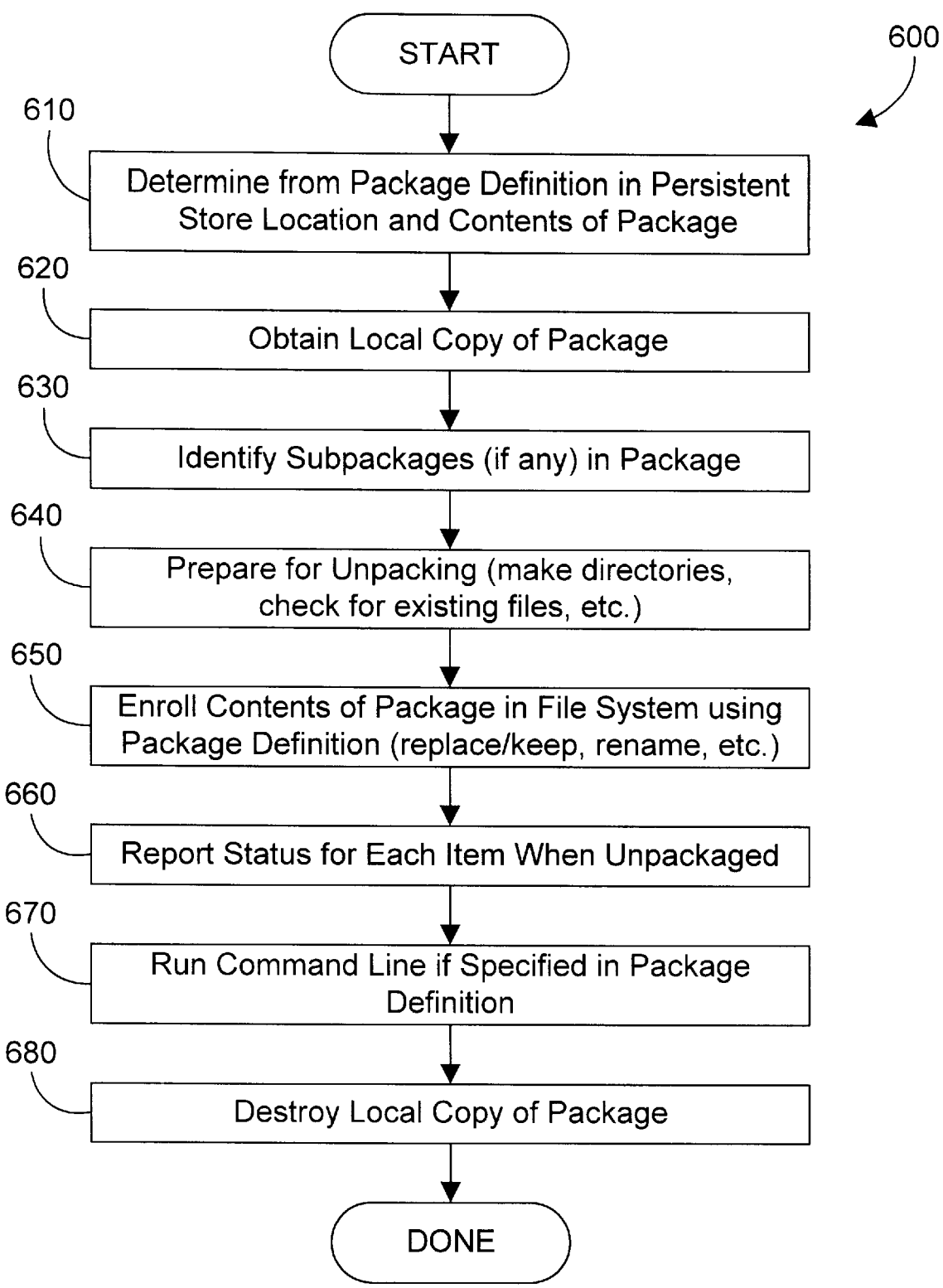
FIG. 6 is a flow diagram showing the steps for unpackaging a package in accordance with the preferred embodiments.

Referring to FIG. 6, a method 600 for unpackaging is preferably performed by unpackager 127 in FIG. 1. Method 600 starts by determining from the package definition in the persistent store the location and contents of a package (step 610). Once a logical package definition is retrieved in step 610, a local copy of the package is created (step 620). This local copy is essentially a physical package with the package elements that are specified in the logical package definition. Once the local copy has been retrieved in step 620, method 600 identifies whether or not there are any subpackages within the package (step 630). Next, the endpoint system prepares for unpackaging the package (step 640). Preparations may includes creating directories in the file system, or checking to see if the file already exists on the endpoint computer system. Next, the contents of the package (i.e., package elements) are enrolled in the file system of the endpoint computer system according to the parameters in the package definition (step 650), which determine whether to replace existing files, rename the package elements, or take other actions during the unpackaging process. Once each item (or package element) is unpacked from the package, the status for the item is reported (step 660). Once all items in the package have been successfully unpacked, a command line specified in the package definition may be run (step 670). Finally, the local copy of the package is destroyed (step 680). The end result is that all package elements have been unpacked and stored on the endpoint computer system according to the parameters specified in the logical package definition.

Figure 7:
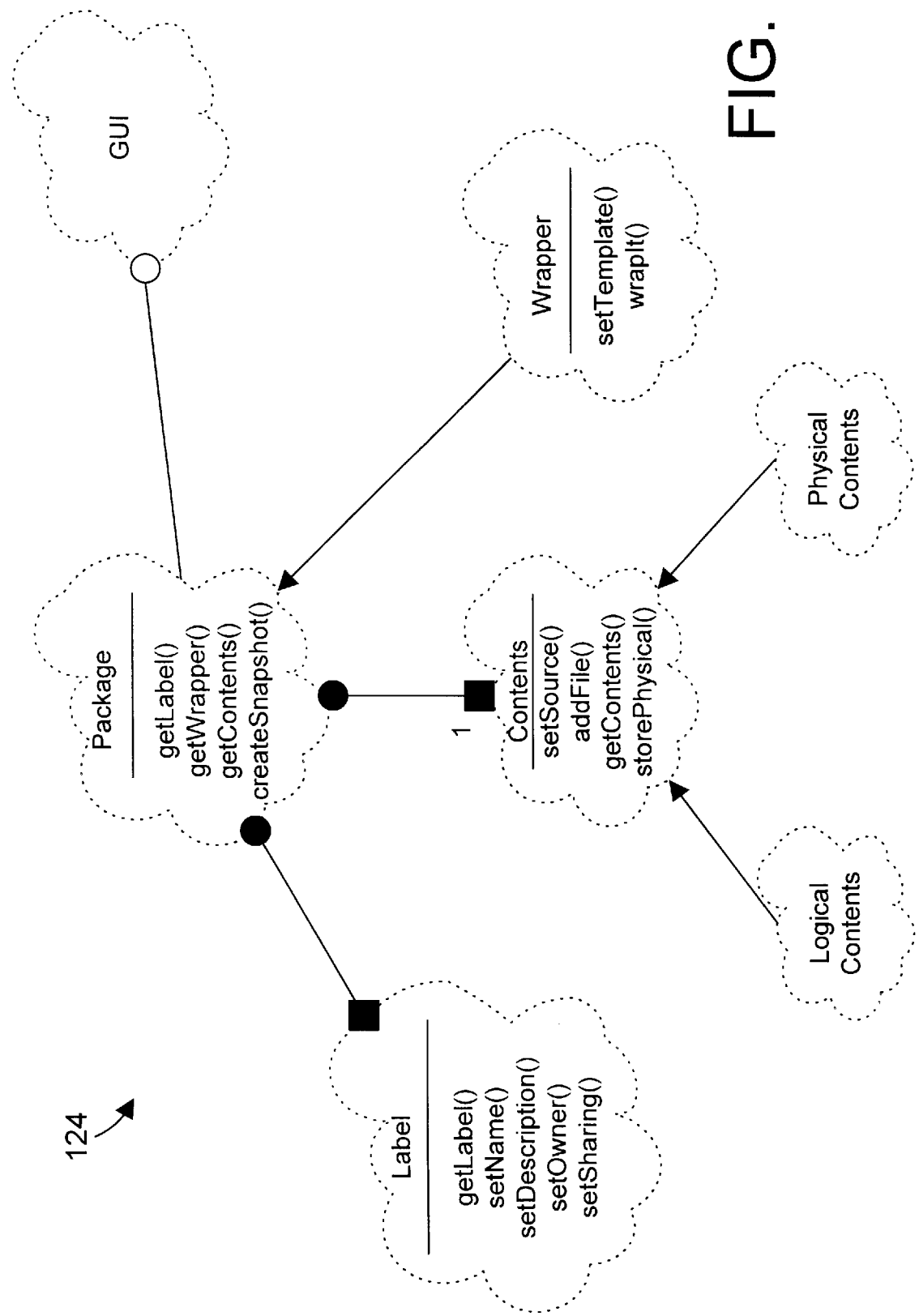
FIG. 7 is a class diagram showing the preferred implementation of the package framework mechanism 124 of FIG. 1.

As shown in FIG. 1, packager 126 and unpackager 127 are preferably implemented using an object oriented package framework mechanism 124. However, other implementations are also within the scope of the present invention. One specific implementation of object oriented package framework mechanism 124 is shown in FIG. 7. Framework mechanism 124 includes a GUI class, a Package class, a Label class, a Contents class, a Wrapper class, a LogicalContents class, and a PhysicalContents class. Each of these classes are extensible by a user, while the class relationships form the core function of framework mechanism 124. The GUI class defines the graphical user interface 125 of FIG. 1. This GUI can include any suitable number or type of displays, sounds, or other means of providing output to the user. The GUI class has a "using" relationship with the Package class, which defines packages in the framework. The Package class includes: a method getLabel() for retrieving the label for a package; a method getWrapper() for retrieving a wrapper object, if any, for the package; and a getContents() method for retrieving the package elements within a package. As stated above, package elements may include other packages as well, and that a package that contains other packages are referred to herein as a "superpackage", while each contained package is referred to herein as a "subpackage". The Package class also defines a createSnapshot() method that is used to create a physical package from a logical package definition. The Package class has a "contains" relationship with each of the Label and Contents classes.

The Label class defines a package label that uniquely identifies the package from all other packages. The Label class defines a getLabel() method for retrieving the label for a package, and further defines methods setName(), setDescription(), setOwner(), and setSharing(), which are used to set attributes for the package that are contained in the label. The Contents class defines the contents of a package, and has a LogicalContents subclass and a PhysicalContents subclass. The Contents class defines a method setSource() that is used to set the source system for the package. The addFile() method on the Contents class allows a file to be added to a package. The addFile() method thus allows a package to be created by incrementally adding files to a package. The getContents() method returns all items in the package. The storePhysical() method causes the physical contents to be stored in a persistent store for later use.

The Wrapper class is a thin wrapper subclass of the Package class, and defines a setTemplate() method and a wrapIt() method. The setTemplate() method is used to associate a template with the package, while the wrapIt() method is used to create a Wrapper instance for an existing Package instance. The operation of framework mechanism 124 of FIG. 7 may best be understood with reference to the object diagrams in FIGS. 8–10.

Figure 8:
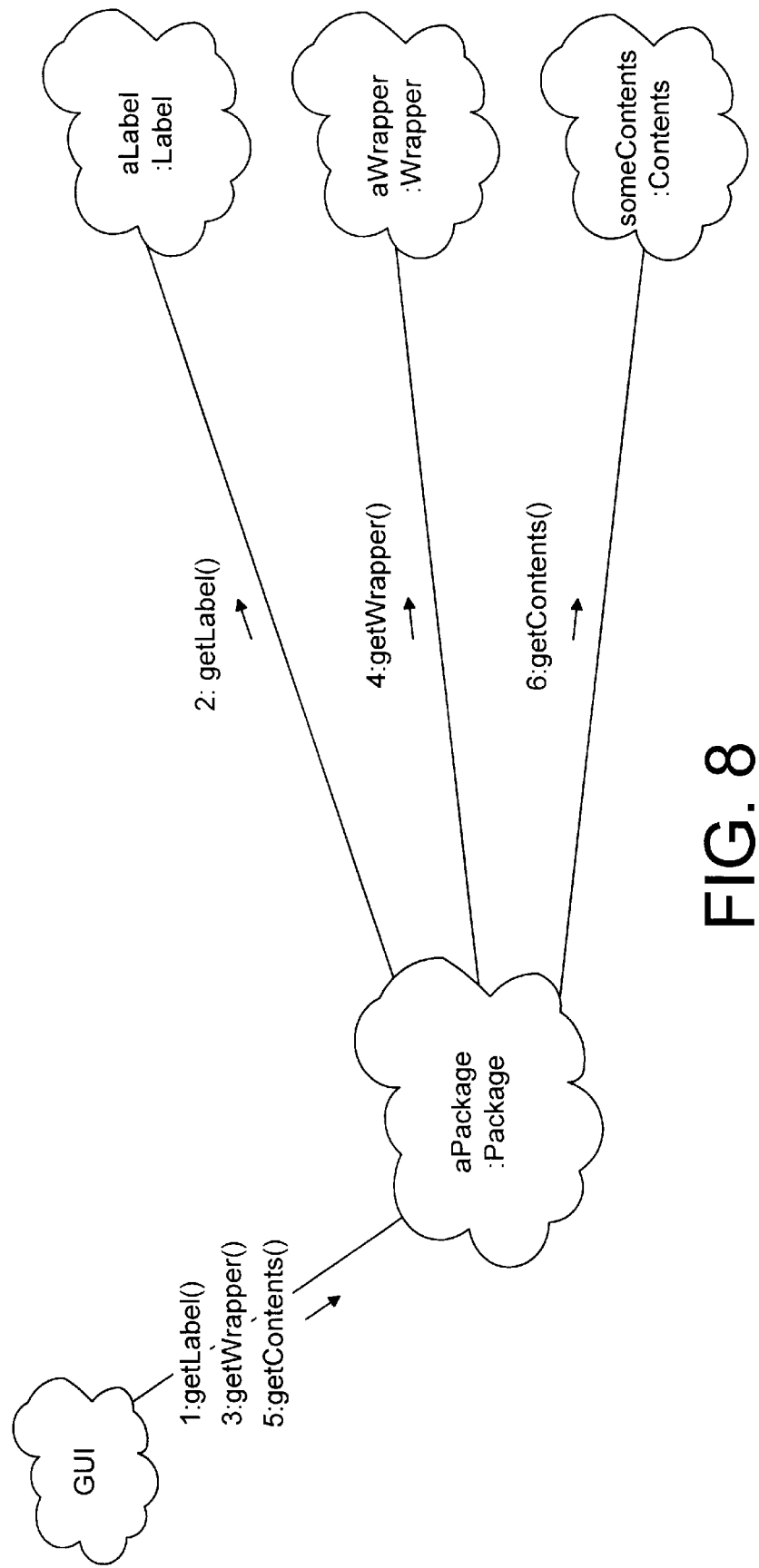
FIG. 8 is an object diagram that includes the steps in accordance with the preferred embodiments for a user to retrieve information relating to an existing package using a graphical user interface.

Referring now to FIG. 8, an object diagram shows the steps in retrieving information about a package. We assume for this example that a GUI object invokes methods on the Package instance, but the invention applies to any client that can invoke methods on the Package instance. When the GUI object invokes the getLabel() method (step 1), the Package instance invokes the getLabel() method on the Label instance (step 2), which returns the label information to the Package instance, which in turn returns this information to the GUI object. When the GUI object invokes the getWrapper() method (step 3), the Package instance invokes the getWrapper() method on the Wrapper instance that corresponds to the Package instance (step 4), which returns the wrapper to the Package instance and on to the GUI instance. When the GUI object invokes the getContents() method (step 5), the Package instance invokes the getContents() method on the corresponding Contents instance for the package (step 6), which returns the contents of the package to the Package instance and on to the GUI instance. Note that the step numbers in FIG. 8 do not imply a specific order for invoking these methods. Any of steps 1,3, or 5 can be performed in any suitable order, which cause the corresponding method calls in steps 2,4, and 6, respectively, to be performed.

Figure 9:
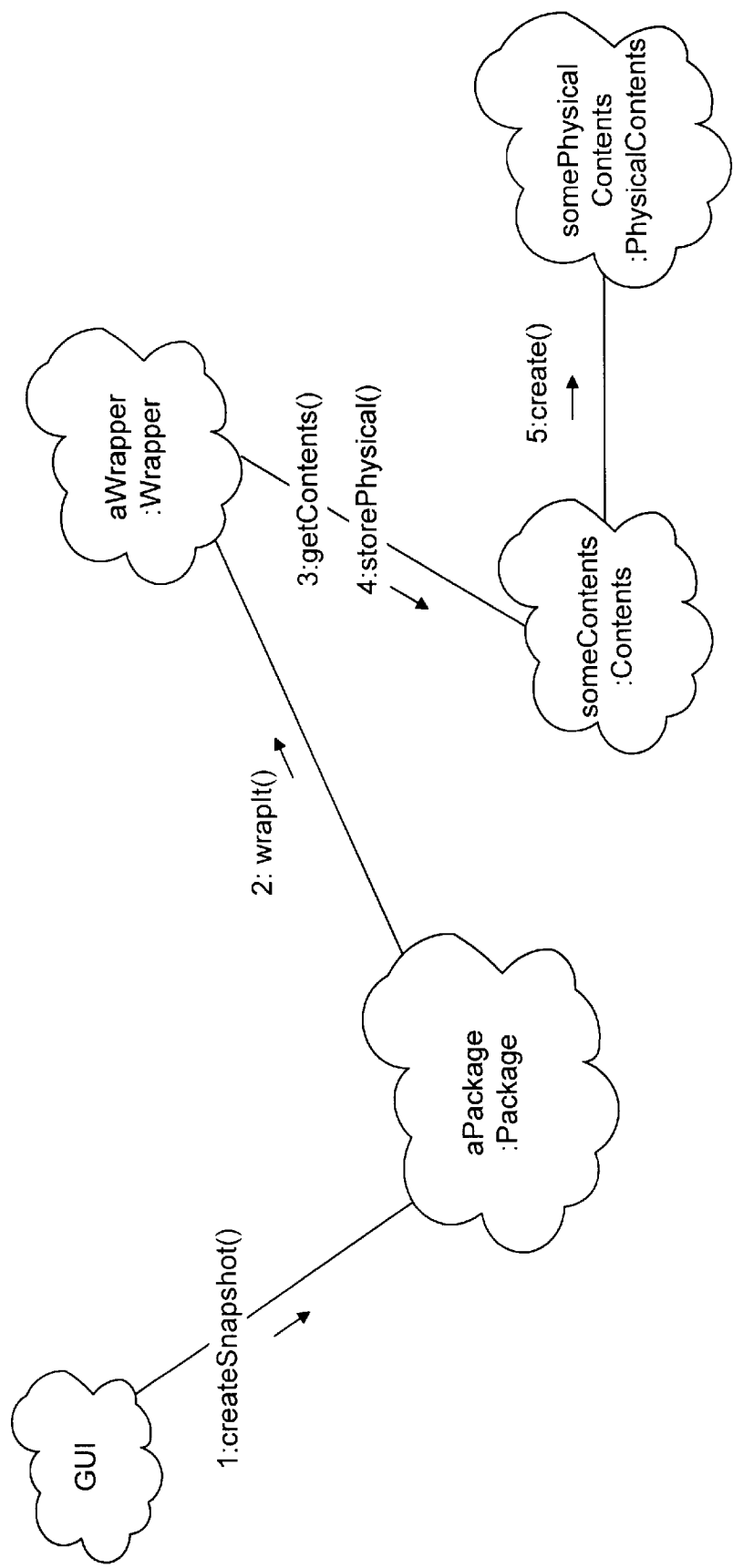
FIG. 9 is an object diagram that includes the steps in accordance with the preferred embodiments for creating a physical package.

Referring now to FIG. 9, the steps for creating a physical package are shown. First, the GUI object invokes the createSnapshot() method on the Package object (step 1). In response, the Package object invokes the wrapIt() method on the Wrapper instance of the package (step 2). The Wrapper instance then invokes the getContents() method (step 3) on the Contents instance, which returns the contents of the Contents instance to the Wrapper instance. Next, the Wrapper instance invokes the storePhysical() method on the Contents instance, passing the Wrapper instance as a parameter (step 4). In response, the Contents instance creates an instance of the PhysicalContents class (step 5) using the information in the Wrapper instance that was passed in step 4. The somePhysicalContents object represents a snapshot, or physical package, for the aPackage object.

Figure 10:
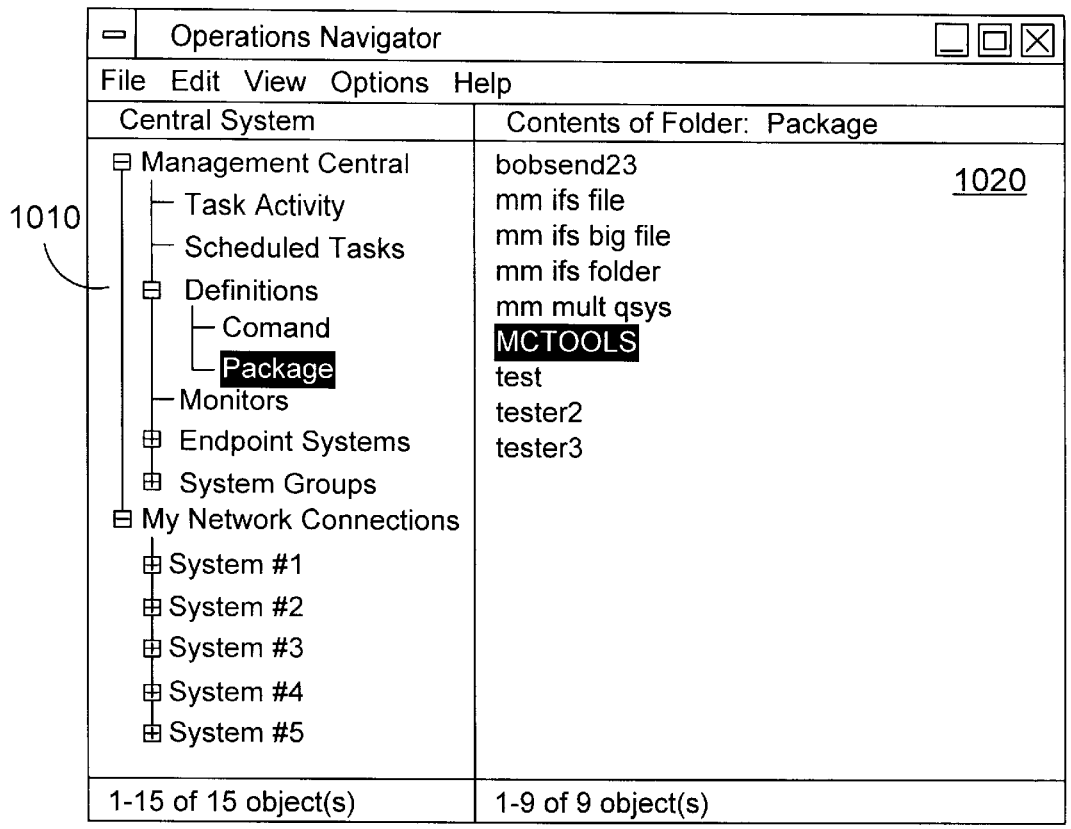
FIG. 10 is a sample graphical user interface display for selecting an existing package.

FIGS. 10–18 show one specific implementation for a graphical user interface for defining and transferring packages in accordance with the preferred embodiments. FIG. 10 shows one suitable interface that allows a user to select among existing packages, and comprises the preferred embodiment for the package selection interface 320 of FIG. 3. A navigator window 1010 displays files and folders, which includes a Package folder. A contents window 1020 displays the contents of a folder. By clicking on the Package folder in navigator window 1010, the contents of the folder are displayed in contents window 1020, as shown in FIG. 10. By clicking on one of the packages in the contents window 1020 (MCTOOLS in this example), the user selects an existing package.

Figure 11:
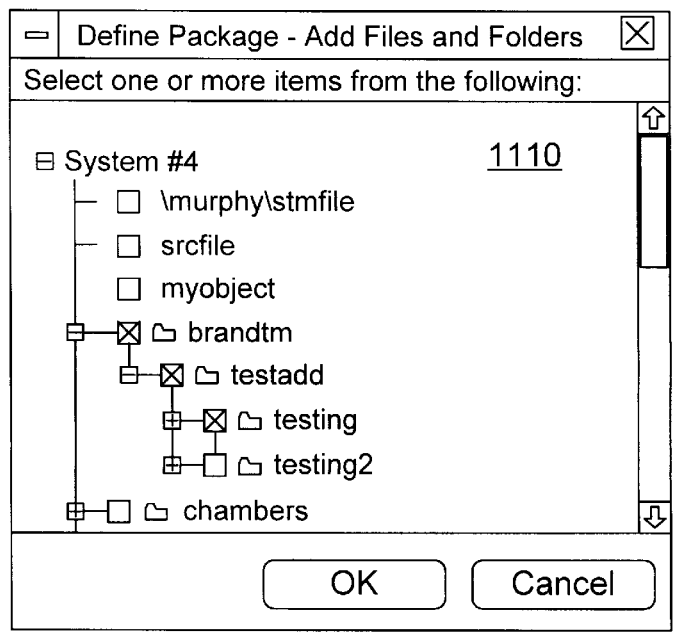
FIG. 11 is a sample graphical user interface display for adding files and folders to a package.
Figure 14:
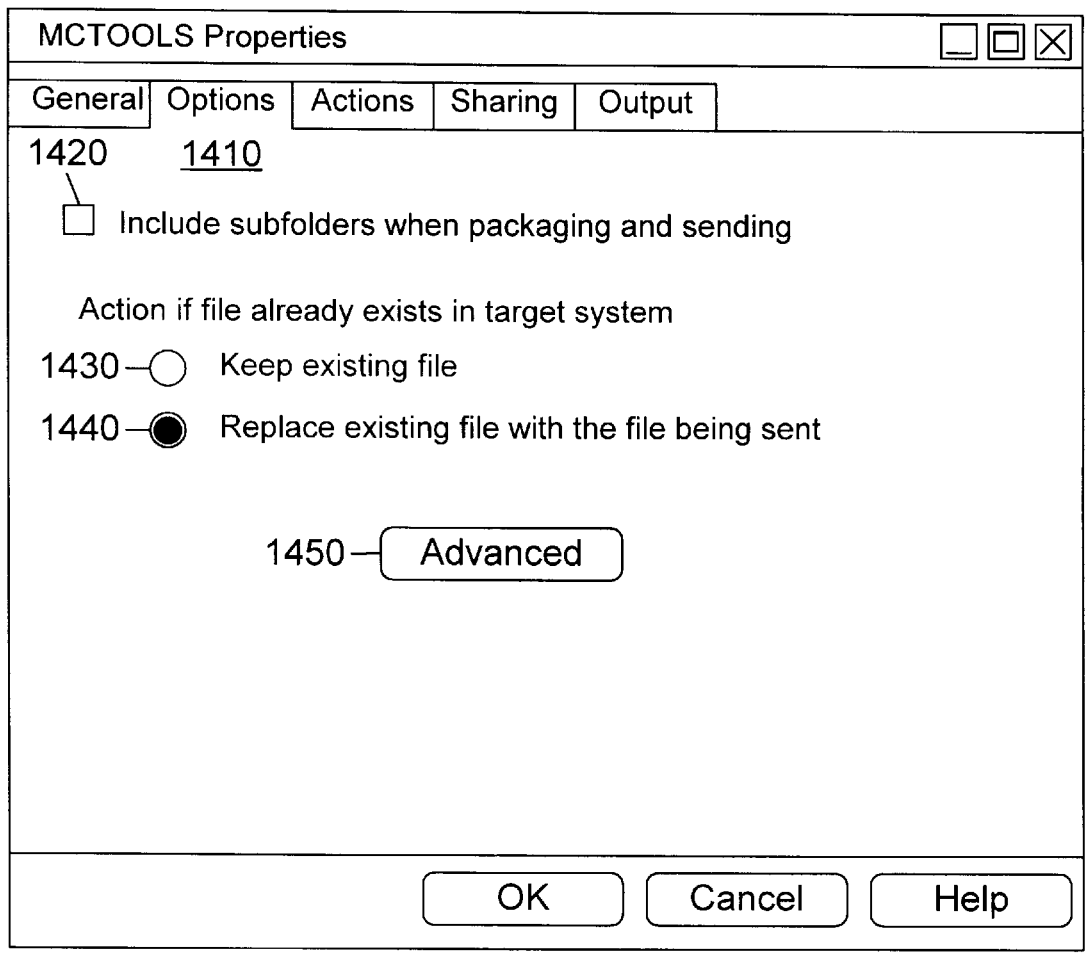
FIG. 14 is a sample graphical user interface display for defining options for a package.

FIG. 11 discloses one suitable way to define a logical package definition, such as MCTOOLS, and comprises the preferred embodiment for package creation interface 310 of FIG. 3. A navigator window 1110 is provided, where files, folders, and any other items include a checkbox next to each item. By checking the checkbox, that item is included in the package. Note that this makes selection of all files in a folder very easy, because the folder itself can be checked, which may automatically includes all files and subfolders (depending on whether or not checkbox 1420 in FIG. 14 is checked, as discussed below). Once a user has checked all the items to include in a package, the user clicks on the OK button. Clicking the Cancel button aborts the package definition process. We assume for this example that a user has defined the MCTOOLS package in FIG. 10 using the navigator shown in FIG. 11.

Figure 12:
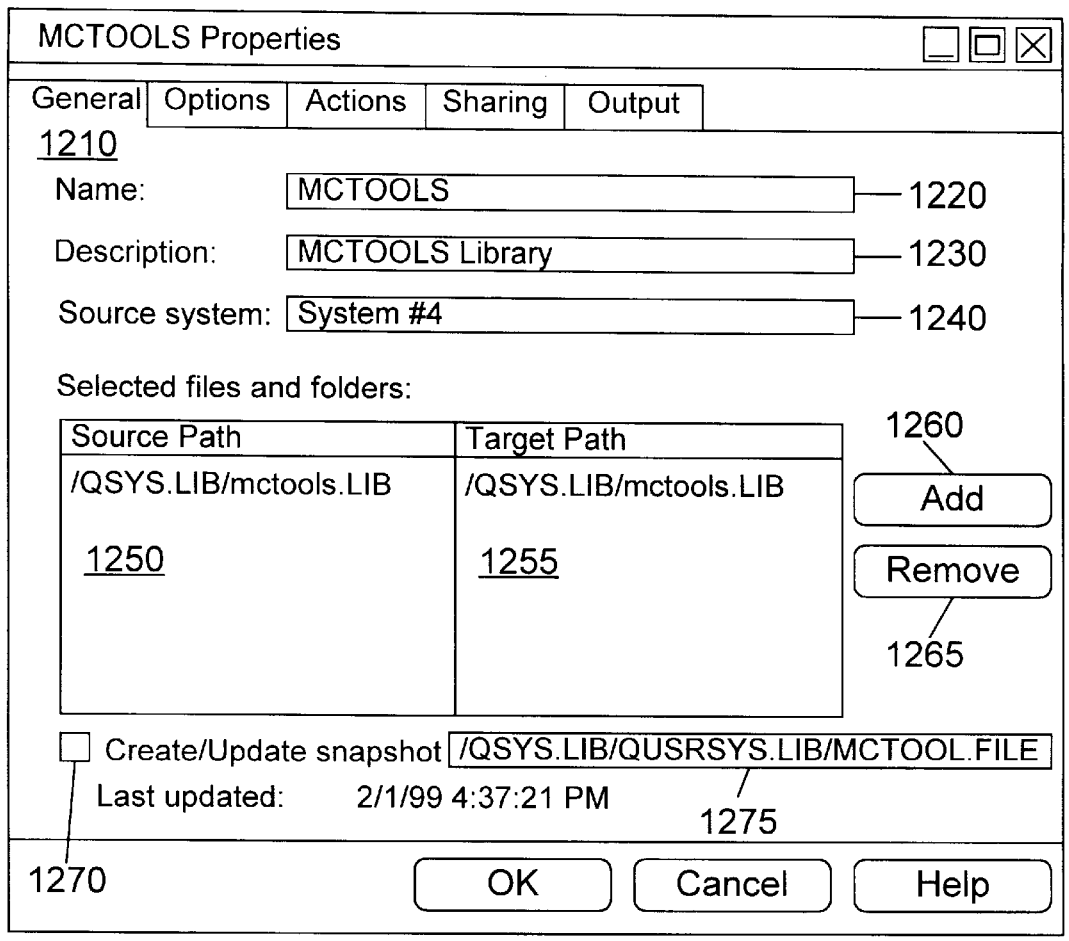
FIG. 12 is a sample graphical user interface display for defining general properties for a package.

FIG. 12 shows one suitable implementation for an interface that allows a user to define attributes for a package. This interface includes multiple tabs General, Options, Actions, Sharing and Output that may each be selected so a user can define attributes for the package. Notice that this interface in FIG. 12 includes the legend "MCTOOLS Properties" at the top to indicate to the user which package is currently selected. In the General tab 1210, a user may set the name of the package in field 1220, the description of the package in field 1230, and the source system in field 1240. In addition, the user may define source and target paths in windows 1250 and 1255, respectively, to allow installing packages in different directories in the target system than in the source system. The Add button 1260 and Remove button 1265 are used to add and delete source path/target path pairs from windows 1250 and 1255. A "Create/Update snapshot" checkbox 1370 may be checked by the user to create a physical package from the logical package definition. The name of the physical package can also be specified in field 1275. Note that the time and date of the last update is also provided to the user to visually indicate how current the snapshot is. The Create/Update snapshot checkbox 1270 and corresponding snapshot name field 1275 comprise one suitable implementation for the physical package generator interface 340 of FIG. 3.

Figure 13:
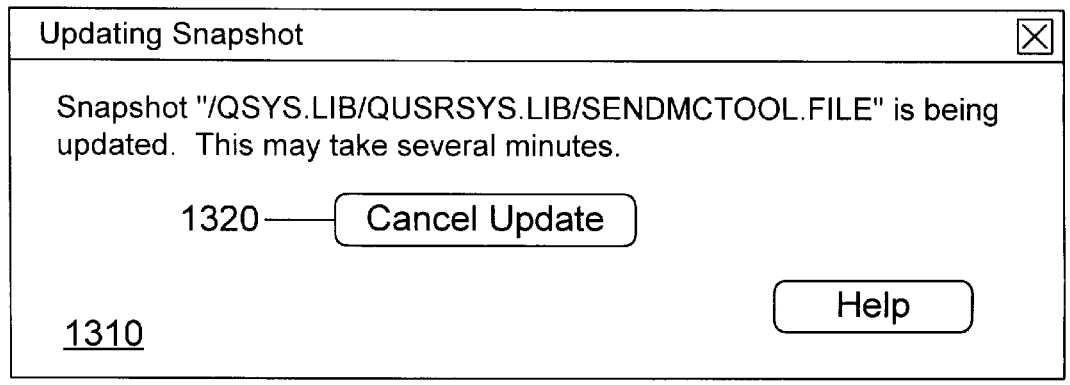
FIG. 13 is a sample graphical user interface display for informing the user that a snapshot of the package is being taken.

FIG. 13 shows a suitable interface that is displayed to a user when a physical package is created or updated due to the user clicking the Create/Update snapshot checkbox 1270 in FIG. 12. This is simply a status screen that informs the user that the snapshot is being updated, and allows the user to cancel the update, if needed, by clicking on the Cancel Update button 1320.

FIG. 14 shows one suitable implementation of the Options interface 1410, which allows a user to include subfolders when packaging and sending a package by checking checkbox 1420, and what action to take if a file already exists on the target system by clicking either radio button 1430 or radio button 1440. This Options interface is the preferred implementation for the package options interface 340 of FIG. 3. The user may include subfolders by checking the checkbox 1420, and may set the package parameters to either keep the existing file on the target system, or to replace the existing file using the mutually-exclusive radio buttons 1430 and 1440 in FIG. 15. Note that an Advanced button 1450 provides access to more options relating to the package that are not specifically addressed here. For example, clicking on the Advanced button 1450 may allow the user to specify: the target release for the package; that the package should continue to be saved even if some object in the package cannot be saved; that objects may be saved while they are active; that object differences can be allowed when objects are restored. Of course, many other advances features could be accessed via the Advanced button 1450.

Figure 15:
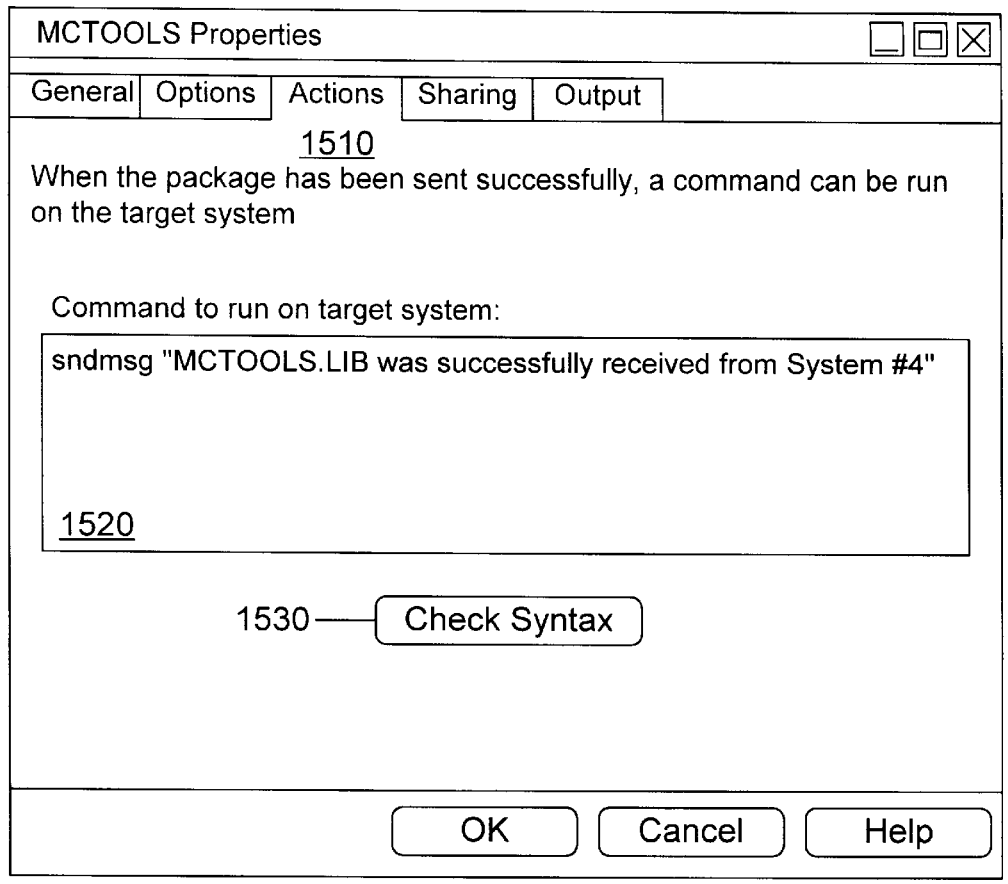
FIG. 15 is a sample graphical user interface display for defining actions to be performed on the receiving system once the package is successfully received.

FIG. 15 shows one suitable implementation for the Actions interface 1510, which comprises a preferred implementation for the package commands interface 350 of FIG. 3. This interface allows a user to input in windows 1520 a command to run on the target system once the package has been successfully received. For the example in FIG. 15, once the MCTOOLS.LIB files is successfully received, a status message is sent to the GUI to indicate that the transfer occurred successfully. The Check Syntax button 1530 runs the commands through a syntax checker that determines whether the command is a proper command that can be run once the package is received. The Actions interface 1510 could be used to specify a command that takes action based on the package just received. For example, a software update may be distributed in a package, and a command can be specified in the Actions interface 1510 to run an executable file that will install the software update from the files just received.

Figure 16:
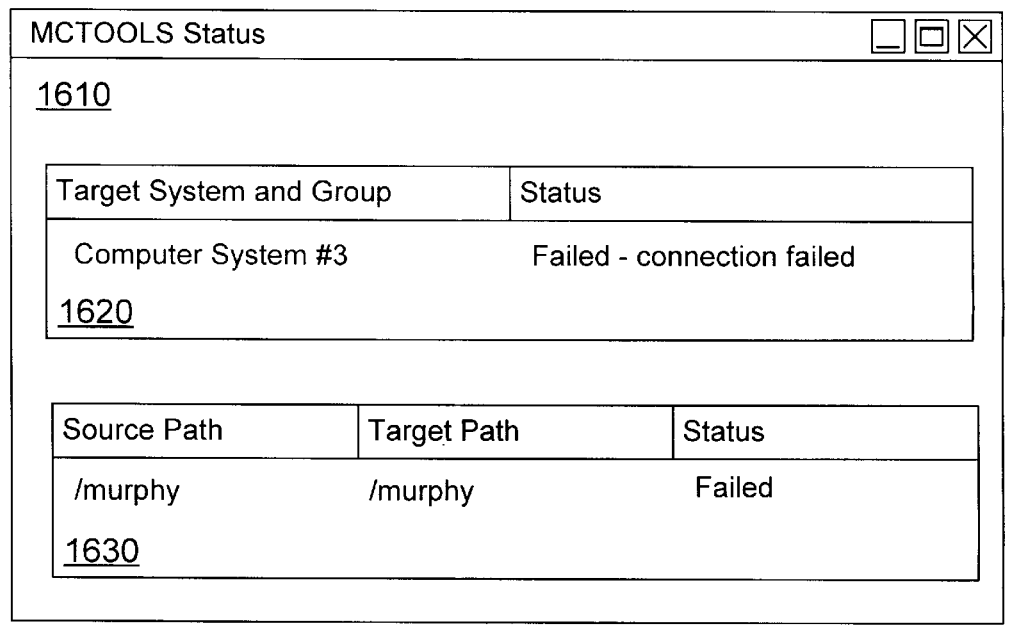
FIG. 16 is a sample graphical user interface display for displaying the status of a package definition and/or transfer.

FIG. 16 shows one suitable implementation for a status interface 1610, which comprises a preferred implementation for the package status interface 360 of FIG. 3. This interface provides status to a user regarding the creation and/or transfer of a package. A status window 1620 displays status messages to a user. A second status window 1630 provides additional information regarding the source path, target path, and status of the creation or transfer.

Figure 17:
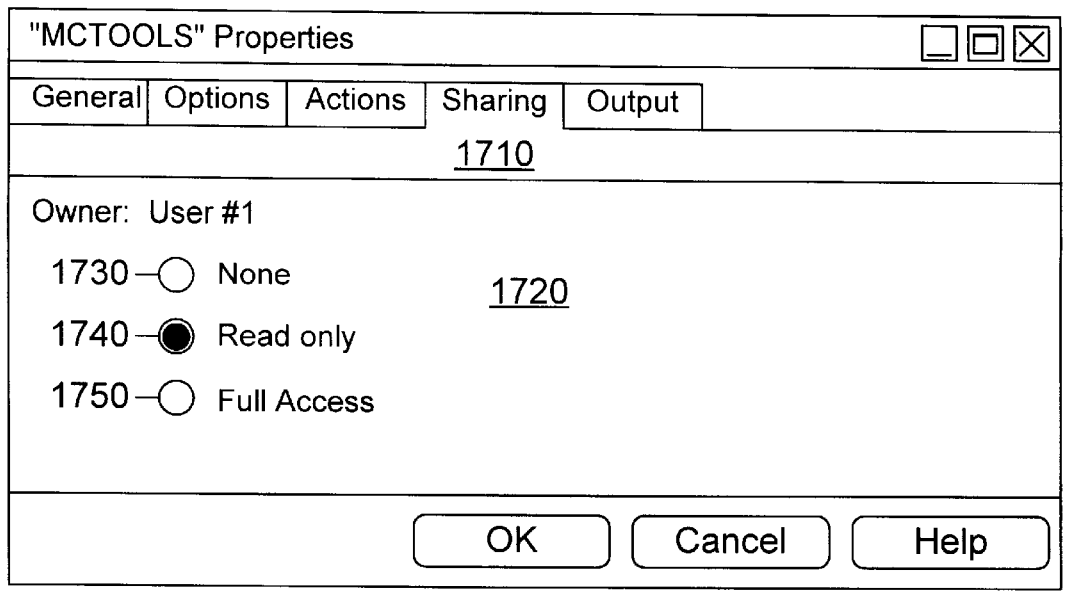
FIG. 17 is a sample graphical user interface display for defining sharing properties for a package.

FIG. 17 shows one suitable implementation for the Sharing interface 1710, which is the preferred implementation for the package sharing interface 370 of FIG. 3. The Sharing interface 1710 includes a window 1720 that allows a user to specify the sharing level for the package. Three suitable sharing levels are "None", which means that no user can share the package; "Read Only", which means that users can read and use the package but cannot change it, and "Full Access", which means that users can read, use and modify the package. Each of these sharing levels is represented by mutually-exclusive radio buttons 1730, 1740, and 1750 in FIG. 17. The MCTOOLS package in FIG. 17 is thus defined to have a "Read Only" sharing level. Note that other suitable sharing levels may be defined. For example, a "view" sharing level might enable a system to see that a package exists, without giving that system the ability to read or modify the package. Once a suitable sharing level has been specified for the package, the user clicks the OK button. Note that an alternative implementation of sharing interface 1710 within the scope of the present invention would allow specifying a sharing level for each individual user or group of users.

Figure 18:
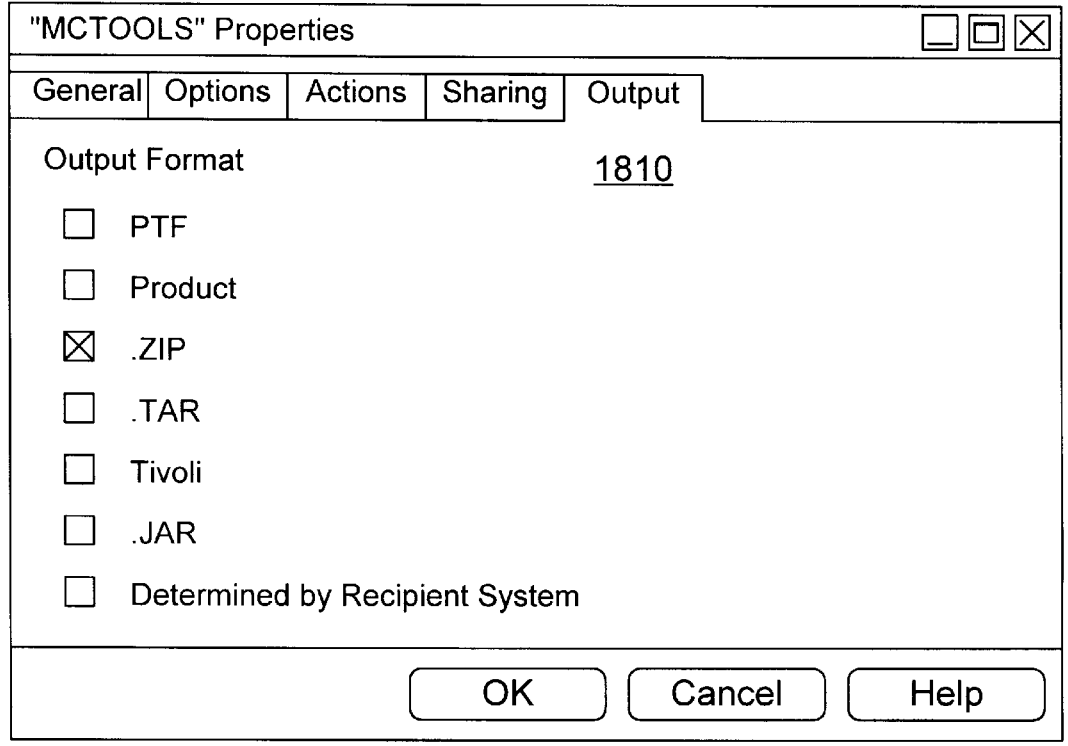
FIG. 18 is a sample graphical user interface display for defining the output format for a package.

FIG. 18 shows one suitable implementation for the Output interface 1810, which is the preferred implementation for the package output interface 380 of FIG. 3. The Output interface 1810 allows a user to set the output format for the package. Examples of some suitable output formats include: PTF, which are program temporary fix files that are used to update or "patch" existing applications; Product, which represents any application file; ZIP, which outputs the package in a compressed format for IBM compatible personal computers; .TAR which outputs the package in a compressed format for UNIX platforms; Tivoli, which outputs the package in a compressed format recognized by Tivoli database systems; and .JAR, which outputs the package in a Java archive file format. In addition, the user may select the "Determined by Recipient System" box, which allows dynamically determining which output format is needed according to the format that the endpoint system expects. Note that the checkboxes in FIG. 18 are not mutually-exclusive, meaning that multiple boxes may be checked, which will cause multiple versions of the package to be generated when a snapshot is taken. Once the user has selected the appropriate output format(s), the user clicks on the OK button.

By defining both logical packages and physical packages, the present invention provides for great flexibility in transferring packages in a distributed environment. For example, a package may be defined to be an archive for data that needs to be logged daily at a certain time. A scheduler could be used to initiate the creation of the physical package at an appropriate time each day, and the physical package would contain the archive information. In addition, the packaging of information allows relatively large blocks of information to be treated as a single unit. This aspect of the invention is especially useful in the context of updating web sites. An entire web site (or portion of a web site) can be packaged together, allowing updates to many pages on the site to be performed in a very short time. By packaging the pages of a web site together, the pages can be created and debugged before being posted on the web site, and can all be posted in one operation, reducing the likelihood of invalid links on a web page that are caused by posting pages to the web site one-by-one. Another aspect of the invention that is especially useful is the ability to execute one or more commands after a package is received. This allows actions that need to be taken on the package to be encapsulated in the package itself, thereby eliminating any need for special client software to recognize a package type and perform appropriate actions.

The present invention provides a consistent approach for defining packages that may be transferred from one computer system to another, as well as defining the packagers for creating the packages and the unpackagers for reading the package elements from the package. By providing pre-defined classes in the package framework, and burying the core functions of the framework so these functions are performed "under the covers" (i.e., these functions are performed by the framework without requiring the user to define these functions) the framework allows a programmer to define package types, packagers, and unpackagers by simply extending the framework, rather than having to write new code.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims.

We claim:

1. An apparatus comprising:
   at least one processor;
   a memory coupled to the at least one processor;
   a packager residing in the memory and executed by the at least one processor, wherein the packager defines a logical package that specifies location of a plurality of package elements, wherein the packager further creates a physical package from the logical package definition, the physical package including a copy of each package element specified in the logical package; and
   a graphical user interface residing in the memory and executed by the at least one processor, the graphical user interface comprising a package creation interface that allows a user to define the logical package.

2. The apparatus of claim 1 further comprising:
   an unpackager residing in the memory that unpackages the plurality of package elements from the physical package.

3. The apparatus of claim 1 wherein the graphical user interface allows a user to create the physical package from the logical package.

4. The apparatus of claim 1 wherein the graphical user interface further comprises:
   a packages selection interface that allows a user to select at least one existing logical package.

5. The apparatus of claim 1 wherein the graphical user interface further comprises:
   a physical package generator interface that allows a user to create the physical package from the logical package.

6. The apparatus of claim 1 wherein the graphical user interface further comprises:
   a package options interface that allows a user to define at least one attribute for the logical package.

7. The apparatus of claim 1 wherein the graphical user interface further comprises:
   a package commands interface that allows a user to specify at least one command to run when the physical package is successfully transferred to an endpoint computer system.

8. The apparatus of claim 1 wherein the graphical user interface further comprises:
   a package status interface that allows a user to receive status information relating to a package.

9. The apparatus of claim 1 wherein the graphical user interface further comprises:
   a package sharing interface that allows a user to specify which users, if any, are authorized to read the package, and that allows a user to specify which users, if any, are authorized to read and modify the package.

10. The apparatus of claim 1 wherein the graphical user interface further comprises:
    a package output interface that allows a user to specify at least one output format for a package.

11. The apparatus of claim 1 wherein the packager is implemented by extending an object oriented package framework mechanism.

12. The apparatus of claim 11 wherein the framework mechanism defines a package class that defines:
    at least one package object that corresponds to the logical package;
    at least one package object that corresponds to the physical package; and
    a first set of object methods to retrieve information about the at least one package object.

13. The apparatus of claim 11 wherein the framework mechanism defines a graphical user interface class that defines:
    at least one user interface object that is used to provide output to a user and to receive input from a user.

14. The apparatus of claim 11 wherein the framework mechanism defines a contents class that defines:
    at least one contents object that contains the plurality of package elements; and
    a second set of object methods to store information to and retrieve information from the at least one contents object.

15. The apparatus of claim 11 wherein the framework mechanism defines:
    a logical contents class that defines at least one logical contents object that specifies the plurality of package elements; and
    a physical contents class that defines at least one physical contents object that contains the plurality of package elements.

16. The apparatus of claim 11 wherein the framework mechanism comprises:
    (A) at least one core function that cannot be modified by a user; and
    (B) at least one extensible class that a user may extend to define a run-time package application.

17. An apparatus comprising:
    (1) at least one processor;
    (2) a memory coupled to the at least one processor; and
    (3) a packager residing in the memory and executed by the at least one processor that defines a plurality of package elements in a logical package and that creates a physical package from the logical package definition, the physical package including a copy of each package element in the logical package;
    (4) an unpackager residing in the memory that unpackages the plurality of package elements from the physical package;
    (5) a graphical user interface that allows a user to define the logical package and that allows the user to create the physical package; the graphical user interface comprising:

(5A) a package creation interface for creating the logical package;

(5B) a package selection interface that allows a user to select at least one existing logical package;

(5C) a physical package generator interface that allows a user to create the physical package from the logical package;

(5D) a package options interface that allows a user to define at least one attribute for the logical package;

(5E) a package commands interface that allows a user to specify at least one command to run when the physical package is successfully transferred to an endpoint computer system;

(5F) a package status interface that allows a user to receive status information relating to a package;

(5G) a package sharing interface that allows a user to specify which users, if any, are authorized to read the package, and that allows a user to specify which users, if any, are authorized to read and modify the package; and (5H) a package output interface that allows a user to specify at least one output format for a package.

18. An apparatus comprising:
(1) at least one processor;
(2) a memory coupled to the at least one processor; and
(3) an object oriented package framework mechanism residing in the memory, the framework mechanism comprising:
   (3A) a package class that defines:
      at least one package object that corresponds to the logical package;
      at least one package object that corresponds to the physical package; and
      a first set of object methods to retrieve information about the at least one package object;
   (3B) a graphical user interface class that defines:
      at least one user interface object that is used to provide output to a user and to receive input from a user;
   (3C) a contents class that defines:
      at least one contents object that contains the plurality of package elements; and
      a second set of object methods to store information to and retrieve information from the at least one contents object;
   (3D) a logical contents class that is a subclass of the contents class and that defines:
      at least one logical contents object that specifies the plurality of package elements; and
   (3E) a physical contents class that is a subclass of the contents class and that defines:
      at least one physical contents object that contains the plurality of package elements.

19. A method for transferring a package of a plurality of package elements to an endpoint computer system, the method comprising the steps of:
defining a logical package that specifies location of the plurality of package elements;
transferring the logical package to the endpoint computer system;
the endpoint computer system determining from the logical package the location of the package elements;
the endpoint computer system retrieving each package element from its respective location; and
the endpoint computer system storing the plurality of package elements.

20. The method of claim 19 further comprising the step of selecting an existing package using a graphical user interface.

21. The method of claim 19 further comprising the step of creating the physical package from the logical package using a graphical user interface.

22. The method of claim 19 further comprising the step of defining at least one attribute for the logical package.

23. The method of claim 19 further comprising the step of specifying at least one command to run when the physical package is successfully transferred to the endpoint computer system.

24. The method of claim 19 further comprising the step of receiving status information relating to the transfer of the package to the endpoint computer system.

25. The method of claim 19 further comprising the step of specifying which users, if any, are authorized to read the package, and specifying which users, if any, are authorized to read and modify the package.

26. The method of claim 19 further comprising the step of specifying at least one output format for the package.

27. The method of claim 19 further comprising the step of:
extending an object oriented package framework mechanism to define a run-time package application, the framework mechanism defining:
   (A) at least one core function of the framework mechanism that cannot be modified by a user; and
   (B) at least one extensible class that a user may extend to define the run-time package application.

28. A method for transferring a package of a plurality of package elements to an endpoint computer system, the method comprising the steps of:
(1) a user extending an object oriented package framework mechanism to define a run-time package application, the framework mechanism comprising:
   (A) at least one core function of the framework mechanism that cannot be modified by a user; and
   (B) at least one extensible class that a user may extend to define the run-time package application;
(2) executing the package application on a computer system;
(3) defining a logical package using a graphical user interface defined in the package framework mechanism;
(4) transferring the logical package to the endpoint computer system;
(5) the endpoint computer system determining from the logical package the location of the package elements;
(6) the endpoint computer system retrieving each package element from its respective location; and
(7) the endpoint computer system storing the plurality of package elements.

29. A program product comprising:
(A) a packager that defines a logical package that specifies location of a plurality of package elements, wherein the packager creates a physical package from the logical package definition, the physical package including a copy of each package element specified in the logical package;
(B) a graphical user interface comprising a package creation interface that allows a user to define the logical package; and
(C) signal bearing media bearing the packager and the graphical user interface.

30. The program product of claim 29 wherein the signal bearing media comprises recordable media.

31. The program product of claim 29 wherein the signal bearing media comprises transmission media.

32. The program product of claim 29 further comprising: an unpackager on the signal bearing media that unpackages the plurality of package elements from the physical package.

33. The program product of claim 29 wherein the graphical user interface allows a user to create the physical package.

34. The program product of claim 29 wherein the graphical user interface further comprises:
a packages selection interface that allows a user to select at least one existing logical package.

35. The program product of claim 29 wherein the graphical user interface further comprises:
a physical package generator interface that allows a user to create the physical package from the logical package.

36. The program product of claim 29 wherein the graphical user interface further comprises:
a package options interface that allows a user to define at least one attribute for the logical package.

37. The program product of claim 29 wherein the graphical user interface further comprises:
a package commands interface that allows a user to specify at least one command to run when the physical package is successfully transferred to an endpoint computer system.

38. The program product of claim 29 wherein the graphical user interface further comprises:
a package status interface that allows a user to receive status information relating to a package.

39. The program product of claim 29 wherein the graphical user interface further comprises:
a package sharing interface that allows a user to specify which users, if any, are authorized to read the package, and that allows a user to specify which users, if any, are authorized to read and modify the package.

40. The program product of claim 29 wherein the graphical user interface further comprises:
a package output interface that allows a user to specify at least one output format for a package.

41. The program product of claim 29 wherein the packager comprises an extended object oriented package framework mechanism.

42. The program product of claim 41 wherein the framework mechanism defines a package class that defines:
at least one package object that corresponds to the logical package;
at least one package object that corresponds to the physical package; and
a first set of object methods to retrieve information about the at least one package object.

43. The program product of claim 41 wherein the framework mechanism defines a graphical user interface class that defines:
at least one user interface object that is used to provide output to a user and to receive input from a user.

44. The program product of claim 41 wherein the framework mechanism defines a contents class that defines:
at least one contents object that contains the plurality of package elements; and
a second set of object methods to store information to and retrieve information from the at least one contents object.

45. The program product of claim 41 wherein the framework mechanism defines:
a logical contents class that defines at least one logical contents object that specifies the plurality of package elements; and
a physical contents class that defines at least one physical contents object that contains the plurality of package elements.

46. The program product of claim 41 wherein the framework mechanism comprises:
(A) at least one core function that cannot be modified by a user; and
(B) at least one extensible class that a user may extend to define a run-time package application.

47. A program product comprising:
(1) a packager that defines a plurality of package elements in a logical package and that creates a physical package from the logical package definition, the physical package including a copy of each package element in the logical package;
(2) an unpackager that unpackages the plurality of package elements from the physical package;
(3) a graphical user interface that allows a user to define the logical package and that allows the user to create the physical package; the graphical user interface comprising:
(3A) a package creation interface for creating the logical package;
(3B) a package selection interface that allows a user to select at least one existing logical package;
(3C) a physical package generator interface that allows a user to create the physical package from the logical package;
(3D) a package options interface that allows a user to define at least one attribute for the logical package;
(3E) a package commands interface that allows a user to specify at least one command to run when the physical package is successfully transferred to an endpoint computer system;
(3F) a package status interface that allows a user to receive status information relating to a package;
(3G) a package sharing interface that allows a user to specify which users, if any, are authorized to read the package, and that allows a user to specify which users, if any, are authorized to read and modify the package;
(3H) a package output interface that allows a user to specify at least one output format for a package; and
(4) computer-readable signal bearing media bearing the packager, the unpackager, and the graphical user interface.

48. The program product of claim 47 wherein the signal bearing media comprises recordable media.

49. The program product of claim 47 wherein the signal bearing media comprises transmission media.

50. A program product comprising:
(1) an object oriented package framework mechanism residing in the memory and executed by the at least one processor, the framework mechanism comprising:
(1A) a package class that defines:
at least one package object that corresponds to the logical package;
at least one package object that corresponds to the physical package; and
a first set of object methods to retrieve information about the at least one package object;

(1B) a graphical user interface class that defines:
   at least one user interface object that is used to provide output to a user and to receive input from a user;
(1C) a contents class that defines:
   at least one contents object that contains the plurality of package elements; and
   a second set of object methods to store information to and retrieve information from the at least one contents object;
(1D) a logical contents class that is a subclass of the contents class and that defines:
   at least one logical contents object that specifies the plurality of package elements; and
(1E) a physical contents class that is a subclass of the contents class and that defines:
   at least one physical contents object that contains the plurality of package elements; and
(2) computer-readable signal bearing media bearing the package class, the graphical user interface class, the contents class, the logical contents class, and the physical contents class.

51. The program product of claim 50 wherein the signal bearing media comprises recordable media.

52. The program product of claim 50 wherein the signal bearing media comprises transmission media.

53. An apparatus comprising:
   at least one processor;
   a memory coupled to the at least one processor; and
   an object oriented framework residing in the memory, the object oriented framework comprising:
      a packager that defines a logical package that specifies a plurality of package elements, wherein the packager further creates a physical package from the logical package definition, the physical package including a copy of each package element specified in the logical package; and
      a graphical user interface residing in the memory and executed by the at least one processor, the graphical user interface comprising a package creation interface that allows a user to define the logical package.

54. The apparatus of claim 53 wherein the framework mechanism comprises:
   (A) at least one core fiction that cannot be modified by a user; and
   (B) at least one extensible class that a user may extend to define a run-time package application that includes the packager and the graphical user interface.

* * * * *